United States Patent [19]

Nakamura et al.

[11] 4,012,665
[45] Mar. 15, 1977

[54] ELECTRONIC FLASH DEVICE WITH CAPACITOR DISCHARGE CUT-OFF BEFORE FULL DISCHARGE

[75] Inventors: Zenzo Nakamura, Urawa; Tokuichi Tsunekawa, Yokohama; Shohei Ohtaki, Machida; Takashi Uchiyama, Yokohama, all of Japan

[73] Assignee: Canon Kabushiki Kaisha, Japan

[22] Filed: Sept. 15, 1975

[21] Appl. No.: 613,470

[30] Foreign Application Priority Data

Sept. 24, 1974 Japan ............................ 49-110088

[52] U.S. Cl. ........................... 315/241 P; 315/151; 315/340; 354/145

[51] Int. Cl.² ................... H05B 41/32; H05B 41/29

[58] Field of Search ............... 315/241 P, 149, 151, 315/159, 340; 250/214 P; 354/32, 33, 145

[56] References Cited

UNITED STATES PATENTS 3,878,433 4/1975 Sato ............................... 315/241 P

*Primary Examiner*—Eugene La Roche
*Attorney, Agent, or Firm*—McGlew and Tuttle

[57] ABSTRACT

The time period necessary to charge a current-to-light convertible energy storing capacitor to a certain voltage is reduced as compared with prior art devices. The energy storing capacitor is connected across a flash tube and switching element series-connected with each other. The switching element is provided with a control circuit, responsive to the voltage of the storage capacitor decreasing to a level at which the flash tube is stopped from producing flash light, for producing a terminating signal by which the switching element is brought into the open or non conducting state. With this arrangement, it is made possible to prevent complete discharge of the electric charge stored in the storage capacitor from occurring, thereby providing the advantage of saving a good fraction of the charging time period which would be otherwise necessary when the storage capacitor is completely discharged to zero voltage.

4 Claims, 5 Drawing Figures

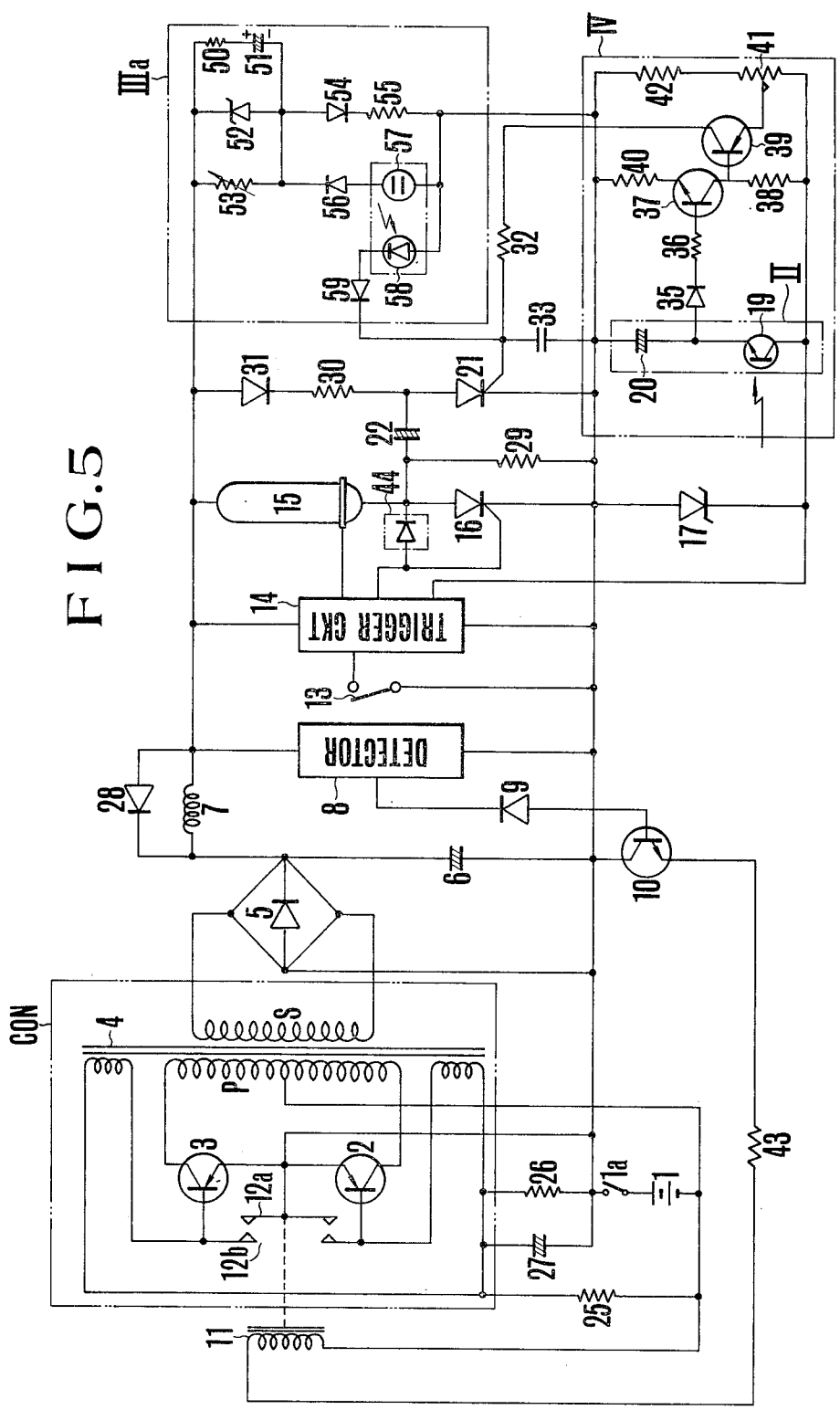

4,012,665

ELECTRONIC FLASH DEVICE WITH CAPACITOR DISCHARGE CUT-OFF BEFORE FULL DISCHARGE

BACKGROUND OF THE INVENTION

1. Field of the Invention

This invention relates to electronic flash devices, and more particularly to an electronic flash device of the type in which the flash tube is supplied with electrical energy from a storage capacitor to produce flash light in synchronism with the discharge thereof.

2. Description of the Prior Art

It is known in the art to provide an electronic flash device in which permits all of the electrical energy stored in a storage capacitor to be discharged through a flash tube in making an exposure of photographic film. With such an electronic flash device, the flash tube produces a flash light in a period of time shorter than that during which the electrical energy is discharged therethrough, as depicted in FIG. 2, wherein A designates a curve showing a variation with time of the voltage applied on the flash tube, B designates a curve showing a variation with time of the flash light intensity as the evervarying voltages of curve A are applied to the flash tube, $Va$ designates a voltage level at which the flash tube is stopped from, or actuated for, emitting flash light, and $Vb$ designates a voltage level lower than $Va$ and at which an ion increase phenomenon in the flash tube is caused to occur, the voltage $Vb$ being hereinafter referred to as "discharge maintenance critical voltage". As a result, the flash tube is energized without production of flash light during a time interval from a time $t_1$ with the voltage $Va$ to a time $t_2$ with the voltage $Vb$ whenever electrical energy is discharged from the storage capacitor through the flash tube. Because of such characteristics of the flash tube, the conventional electronic flash device has the disadvantages of providing less flash light in relation to the amount of electrical energy used up, namely, operating at a lower luminous efficiency, and of requiring a longer time period for the next charging of the storage capacitor than that which would be otherwise required when the duration of discharge of the storage capacitor is terminated at the time $t_1$, or in synchronism with the termination of flash light emission of the flash tube. In the latter connection, as shown in FIG. 3, the difference between time intervals necessary for a storage capacitor having a capacitance of 2000 $\mu$F to be charged from zero voltage to a predetermined voltage corresponding to 100% storage of electrical energy and to be charged from a voltage corresponding to 10% storage of electrical energy to the predetermined voltage amounts to as long as 3 seconds. It will be appreciated that a good fraction of the charging period time is spent in vain for the next charging operation of the storage capacitor, since the conventional device permits discharge even after the time $t_1$ or the termination of flash light production. Such disadvantages have been also encountered with the use of another type of electronic flash devices, as, for example, disclosed in U.S. Pat. No. 3,591,829, in which the flash tube is provided with a switching element connected in series therewith and arranged to be controlled by an output signal of a light measuring circuit responsive to the light reflected from an object being photographed, particularly when the object distance is relatively long.

SUMMARY OF THE INVENTION

An object of the present invention is to provide an improved electronic flash device having a higher luminous efficiency and of which the storage capacitor can be charged in a shorter period of time than has been previously possible.

Another object of the present invention is to provide an electronic flash device of the type having a $t$ storage capacitor connected to a flash tube and arranged so that, when the voltage applied on the flash tube has dropped to a critical flash light emission stop voltage, the discharge circuit of the storage capacitor is opened.

Still another object of the present invention is to provide an electronic flash device of high luminous efficiency and of shorter charging time period for the storage capacitor thereof and of simple structure.

Other objects of the present invention will become apparent from the following detailed description taken in conjunction with the accompanying drawings in which:

BRIEF DESCRIPTION OF THE DRAWINGS

FIG. 5 is a diagram, partially in block form, of the circuitry of an electronic flash device according to another embodiment of the present invention.

DETAILED DESCRIPTION OF THE PRESENT EMBODIMENTS

Figure 1:
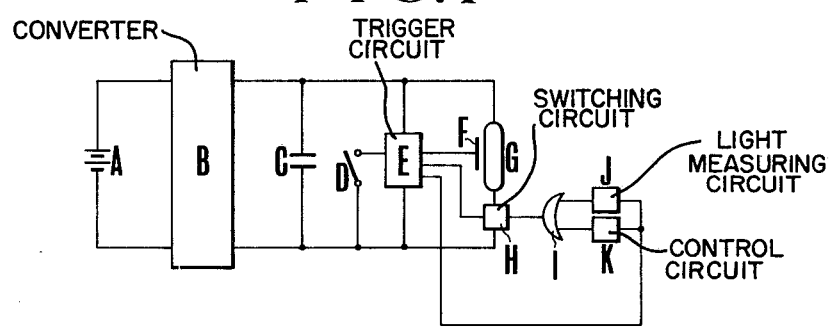
FIG. 1 is a schematic circuit diagram showing the principle of the present invention.

Referring to FIG. 1, there is shown an electronic flash device comprising a power source A, a converter B, a storage capacitor C connected through the converter B to the power source A, a trigger switch D associated with a trigger circuit E so that, when the trigger switch D is closed, the trigger circuit E produces a trigger signal as an output thereof, and a flash tube G having a trigger electrode F connected to the output of trigger circuit E, having an anode connected to the positive pole of the storage capacitor C and having a cathode connected through a switching circuit H to the negative pole of the storage capacitor C. The switching circuit H has two input terminals, one of which is connected to the output terminal of the trigger circuit E and the other of which is connected through an OR gate I to the output terminals of a light measuring circuit J and a control circuit K. The light measuring circuit J may be constructed in a manner known in the art, for example, as shown in U.S. Pat. No. 3,591,829 as comprising a light sensitive element, such as a photo-transistor or silicon photo-cell, and an integrating capacitor. The control circuit K includes a RC timing circuit having a time constant corresponding to a time interval required for the storage capacitor C to be discharged from 100% storage of electrical energy to 10% storage, in other words, a time constant such that, when the voltage of the storage capacitor has reached the critical flash light emission stop voltage, $Va$, mentioned above, the control circuit K produces an output signal serving as a control signal for the switching circuit H.

Figure 2:
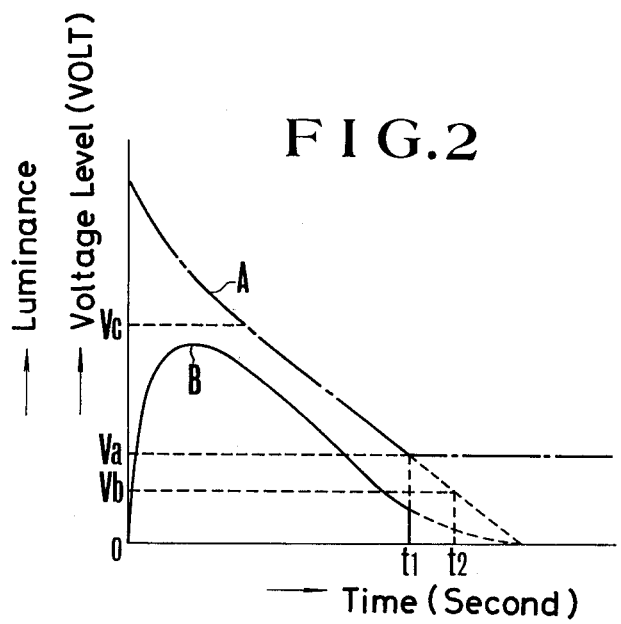
FIG. 2 is a graphic representation of operating principles of a flash tube.
Figure 3:
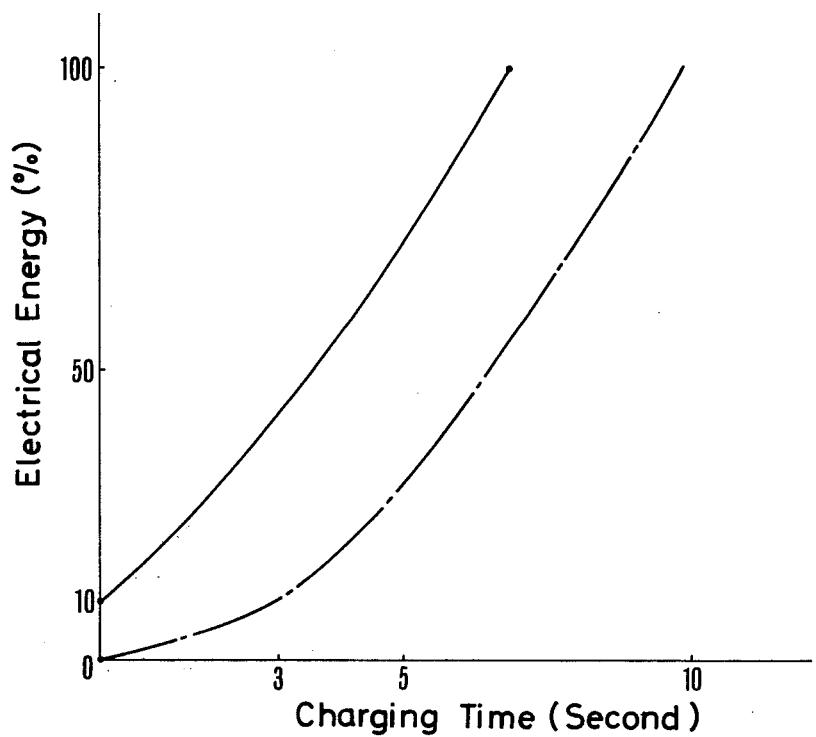
FIG. 3 is a graph showing an example of correlation between charging time in seconds of a storage capacitor and the percentage of electrical energy stored on the storage capacitor.

Consideration will next be given to the operating principle of the present invention in connection with FIGS. 2 and 3. Assuming now that the storage capacitor C has a capacity of 2,000 μF and is initially charged to 0% storage of electrical energy, when the voltage of the power source A after being increased by the converter B is applied to the storage capacitor C, the percentage of electrical energy stored in the capacitor C varies with time in seconds as shown by the dot-and-dash curve in FIG. 3, reaching 100% in 10 seconds. After the storage capacitor C has been charged to a predetermined voltage equal to the output voltage of the converter B, the operator may close the trigger switch D, whereupon the trigger circuit E is rendered operative to produce a trigger signal, which is then applied to the trigger electrode F of the flash tube G, as well as a driving signal, which is applied to each of the switching circuit H, light measuring circuit J and control circuit K. Upon advent of the trigger signal on the trigger electrode F of flash tube G, the flash tube G is triggered to initiate discharge of the storage capacitor C therethrough as the switching circuit H is closed by the driving signal. In synchronism with the initiation of discharge of the storage capacitor C, the light measuring circuit J and control circuit K are actuated for a counting operation by the driving signal. In the case where the amount of light reflected from the object being illuminated with the energized flash tube reaches a predetermined level as measured by the light measuring circuit J before the time $t_1$ indicated in FIG. 2, that is, before the voltage applied on the flash tube from the storage capacitor C reaches the critical flash light emission stop voltage level V$a$, the switching circuit H is rendered cooperative, through the OR gate I, with the light measuring circuit J in a manner to be turned off by a control signal supplied from the circuit J to thereby terminate the discharge of the storage capacitor C through the flash tube G. As a result, an amount of electrical energy which is more than 10% of capacity is left in the storage capacitor after the flashing operation. On the other hand, in the case where the amount of light sensed by the light measuring circuit J does not reach the predetermined level by the time $t_1$ because of, for example, the relatively long distance from the flash tube G to the object, the switching circuit H is rendered cooperative, through the OR gate I, with the control circuit K in a manner to be turned off by a control signal supplied from the control circuit K to terminate the discharge of the storage capacitor C, at a time near the time $t_1$. As a result, the storage capacitor C remains charged to at least 10% of the capacity thereof after the flashing operation. Therefore, the next charge of the storage capacitor C to 100% capacity thereof can be effected in about 7 seconds at most as shown by the solid line curve in FIG. 3.

Figure 4:
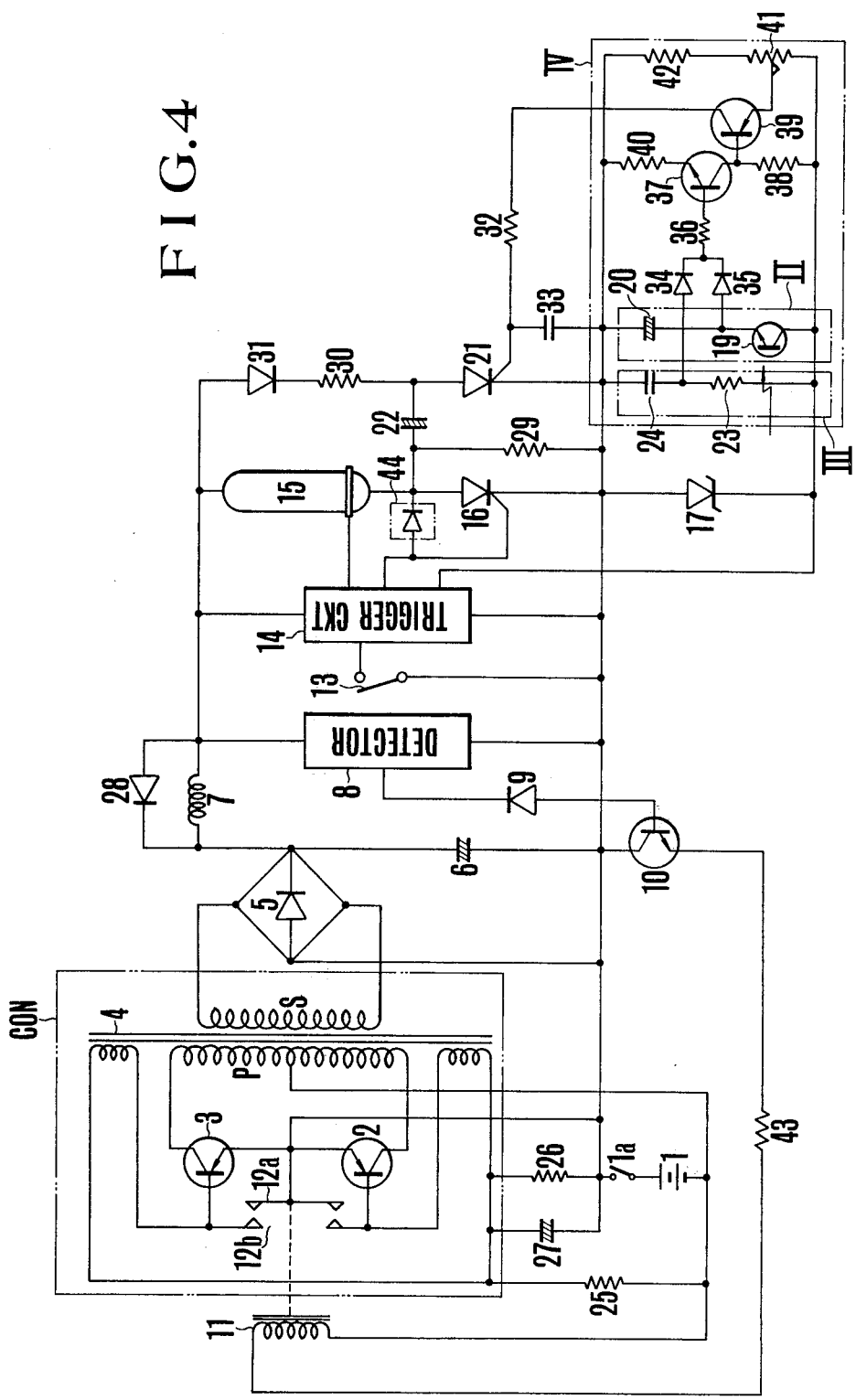
FIG. 4 is a diagram, partially in block form, of the circuitry of an electronic flash device according to one embodiment of the present invention.

Referring now to FIG. 4, there is shown a practical example of the circuitry of FIG. 1 for use in an electronic flash device according to one preferred embodiment of the present invention. In FIG. 4, reference character CON designates a converter constructed in a manner known in the art as comprising a pair of pnp-type transistors emitter-connected with each other, a transformer 4, having a primary winding P with its ends being connected to the respective collector electrodes of transistors 2 and 3 and with a central tap connected to the positive terminal of a battery 1 as the power source, and a secondary winding S connected to a rectifier circuit 5 for full-wave rectification of the output of the converter CON. 6 is a storage capacitor having a positive pole connected to the output of the rectifier circuit 5 and having a negative pole connected to the negative bus. In order to detect whether or not the storage capacitor 6 is charged to a predetermined voltage, there is provided a detector 8 comprising a neon tube, for example, connected across the storage capacitor 6 through a coil 7 and having an output terminal connected to one end of a switching element 9, the opposite end of which is connected to the base electrode of a npn-type transistor 10. 11 is a coil connected between the emitter electrode of the transistor 10 and the positive terminal of the power source 1 and cooperating with a relay 12 in such a manner that, when the transistor 10 is rendered conducting, the relay contact 12a is brought into contact with the contact 12b to short-circuit the base and emitter electrodes of transistors 2 and 3 to cut off the converter CON from the power source 1. 13 is a trigger switch associated with a trigger circuit 14 having three output terminals, one of which is connected to a trigger electrode of a flash tube 15, another of which is connected to a control electrode of a first silicon controlled rectifier element 16, and the other of which is connected to one end of a Zener diode 17, the other end of which is connected to the negative bus. The first SCR element 16 is connected between the cathode of the flash tube 15 and the negative bus, serving as a switching element for the flash tube 15. The Zener diode 17 serves to apply a predetermined voltage to a discharge control circuit IV in response to an application of an output signal thereon from the trigger circuit 14. The discharge control circuit IV comprises a light sensitive element 19, such as a photo-transistor, a capacitor 20 connected in series with the photo-transistor 19, the parts 19 and 20 constituting a light measuring circuit II, a resistor 23, a capacitor 24 connected in series with the resistor 23, the parts 23 and 24 constituting a RC timing circuit III, a pair of diodes 34 and 35, one of which, say, diode 34 is connected at the positive terminal to a point on the connection between the resistor 23 and capacitor 24, and the other of which, say, diode 35 is connected at the positive terminal to a point on the connection between the capacitor 20 and photo-transistor 19, a npn-type transistor 37 having a base electrode connected through a resistor 36 to the negative electrodes of both the diodes 34 and 35, having an emitter electrode connected through a resistor 40 to the negative bus and having a collector electrode connected through a resistor 38 to the positive electrode, and a pnp-type transistor 39 having a base electrode connected to the collector electrode of transistor 37 and having an emitter electrode connected to a slide tap of a variable resistor 41 connected in series with a resistor 42. The collector electrode of the transistor 39 is connected through a resistor 32 to a control electrode of a second silicon controlled rectifier element 21 whose positive electrode is connected to the positive electrode of the first silicon controlled rectifier element 16 through a commutation capacitor 22, so that, when the transistor 39 is rendered conducting, the second SCR 21 is turned on to apply a reverse voltage across the first SCR 16 through a resistor 29 connected across the first SCR 16, whereby the first SCR 16 is turned off to terminate the duration of discharge of the storage capacitor 6 through the flash tube 15. 25, 26, 30 and 32 are resistors. 27 and 33 are capacitors. 28 and 31 are diodes.

The operation of the electronic flash device of FIG. 4 is as follows. When the power switch 1a is closed, the transistors 2 and 3 begin to operate in an oscillating manner, causing the converter CON to produce outputs which, after being rectified by the rectifier circuit 5, are applied to the storage capacitor 6. When the storage capacitor 6 is charged to a predetermined voltage, the detector 8 is actuated, whereby the transistor 10 is rendered conducting through the switching element 9, permitting a current to flow through the transistor 10, resistor 43 and coil 11. As the coil 11 is energized, the relay 12 is operated to short-circuit the emitter and base electrodes of the transistors 2 and 3, whereby the converter CON is cut off from the power source 1 to produce no more output.

When the trigger switch 13 is closed in response to the depression of a shutter button (not shown), the trigger circuit 14 is actuated to produce a trigger signal which is applied to the trigger electrode of the flash tube 15 and also to produce a driving signal which is applied to both of the first SCR 16 and the Zener diode 17, thereby initiating discharge of the storage capacitor 6 through the flash tube 15 and, at the same time, rendering operative the discharge time control circuit IV. Now assuming that an object being illuminated with the energized flash tube 15 is located at a relatively short distance from the flash tube 15, before the storage capacitor 6 is discharged to 10% storage of electrical energy thereon, the voltage of the timing capacitor 20 of the light measuring circuit II reaches a predetermined level, causing the diode 35 to be rendered conducting to apply a signal from the transistor 39 to the gating electrode of the second SCR 21. Upon advent of the signal on the second SCR 21, the commutation capacitor 22 is caused to be discharged through the second SCR 21 and resistor 29 to apply a reverse voltage to the first SCR 16, whereby the discharge circuit for the storage capacitor 6 is opened to terminate the duration of energization of the flash tube 15. Now conversely assuming that the distance from the flash tube 15 to the object is relatively long, when the storage capacitor 6 is discharged to about 10% storage of electrical energy, the timing circuit III produces an output signal which is then applied to the transistor 37. The subsequent operation proceeds in a manner similar to that shown in connection with the former assumption. In the both cases, the voltage of the storage capacitor 6 is varied with time in a manner illustrated by a dot-dash curve A of FIG. 2 to insure that the storage capacitor remains charged to at least 10% storage of electrical energy after every discharging operation.

The electrical circuit of FIG. 4 is susceptible to various modifications. For example, instead of using a silicon controlled rectifier element as the switching element 16, it is possible to use a gate turn-off element in combination with a diode 44 connected between the output terminal of the trigger circuit 14 and one of the electrodes, say the cathode, of the flash tube 15 as indicated in FIG. 4. Further, in the example of FIG. 4, an RC timing circuit Ii is used as the control circuit K of FIG. 1. This arrangement, however, is disadvantageous in effecting accurate control of the discharge time period. From this point of view, it is preferred to arrange the control circuit K to be responsive to the voltage of the storage capacitor 6 attaining a predetermined level. An example of such an arrangement is shown in FIG. 5.

Referring to FIG. 5, there is shown another preferred embodiment of the electronic flash device according to the present invention, wherein the same reference characters are employed to denote parts corresponding to those shown in FIG. 4. IIIa designates a control circuit used instead of the RC timing circuit III of FIG. 4, in which is a resistor and 51 is a capacitor connected in series with the resistor 50. 52 is a Zener diode connected in parallel with the series-connected resistor 50 and capacitor 51 and provides a Zener voltage of about 200 volts serving as a voltage Vc shown in FIG. 2. A diode 54 and a resistor 55 are connected in series with each other and with the Zener diode 52. A variable resistor 53 is connected across the Zener diode 52. A diode 56 and a neon tube 57 are connected in series with each other and to the variable resistor 53. The neon tube has a critical break-down voltage almost equal to the critical flash light emission stop voltage $V_a$ shown in FIG. 2. Radiantly cooperative with the neon tube 58 is a photo-voltaic cell 58 having an output terminal connected through a diode 59 to the gating electrode of the second SCR 21.

The operation of the circuit of FIG. 5 will next be described in some detail with reference to FIG. 2. The storage capacitor 6 is discharged through two circuits, one of which can be traced from the positive pole of the storage capacitor 6 through the coil 7, flash tube 15 and first SCR 16 to the negative pole of the storage capacitor 6, and the other of which can be traced from the positive pole of the storage capacitor 6 through the resistor 50, capacitor 51, Zener diode 52, resistor 53, diode 54 and resistor 55 to the negative pole of the storage capacitor 6. In this arrangement, the voltage of the capacitor 51 is maintained constant at a level almost equal to the Zener voltage $V_c$ until the voltage of the storage capacitor 6 reaches the critical flash light emission stop voltage $V_a$. When the voltage of the storage capacitor 6 drops slightly below the voltage $V_a$, the voltage of the capacitor 51 exceeds the sum of the critical breakdown voltage of the neon tube 57 and the critical emission stop voltage, namely, $2V_a$ and the capacitor 51 is discharged through a circuit which can be traced the positive pole of capacitor 51 through the resistor 50, flash tube 15, first SCR 16, neon tube 57 and diode 56 to the negative pole of the capacitor 51, whereby the neon tube 57 is lighted causing the photovoltaic cell 58 to produce an output signal which is then applied to a capacitor 33 and to the gating electrode of the second SCR 21. As the voltage of the capacitor 33 is increased in a pulse form, the second SCR 21 is turned on and then the first SCR 16 is turned off to open the first-named discharge circuit of the storage capacitor 6. Therefore, the second embodiment of the present invention also preserves at least 10% storage of electrical energy in the storage capacitor.

It will be seen from the foregoing description that the present invention provides an electronic flash device having a storage capacitor arranged, upon the voltage thereof attaining a critical flash light emission stop voltage $V_a$, to be stopped from discharging, whereby it is made possible to insure that a certain amount of electrical energy is always preserved in the storage capacitor. This arrangement provides the advantages of reducing some of the subsequent charge time periods which would be otherwise necessary as in the prior art, improving the luminous efficiency of a flash tube associated with the storage capacitor, increasing the lifetime of a battery used as the power source for the flash tube due to the increase in the luminous efficiency, and avoiding occurrence of flash light emissionless discharge in the flash tube in a time period from the time $t_1$ to the time $t_2$ shown in FIG. 2 which in turn results in an increase in the life-time of the flash tube.

What is claimed is:

1. An electronic flash system for illuminating an object comprising;
    a. a photosensitive element for producing a first control signal in response to a predetermined amount of light incident on said photosensitive element,
    b. a storage capacitor,
    c. a first semiconductor switching device including a control electrode and two main current carrying electrodes,
    d. a flash tube connected in series with said first semiconductor switching device, the series circuit of said flash tube and said first semiconductor switching device being connected across said storage capacitor,
    e. a first trigger circuit for firing said flash tube and applying a closing trigger signal to the control electrode of said first semiconductor switching devices,
    f. a control circuit, responsive to the voltage of said storage capacitor attaining a critical flash light emission stop voltage of said flash tube, for producing a second control signal, and
    g. a second trigger circuit connected between said first semiconductor switching device and said control circuit and responsive to said first and second control signals for bringing said first semiconductor switching device into the non-conducting state.

2. An electronic flash system according to claim 1, wherein said second trigger circuit includes OR gate means connected to said control circuit and said photosensitive element.

3. An electronic flash system according to claim 2, wherein said OR gate means includes two diodes.

4. An electronic flash system for illuminating an object comprising;
    a. an element for producing a first control signal,
    b. a storage capacitor,
    c. a first semiconductor switching device including a control electrode and two main current carrying electrodes,
    d. a flash tube connected in series with said first semiconductor switching device, the series circuit of said flash tube and said first semiconductor switching device being connected across said stroage capacitor.
    e. a first trigger circuit for firing said flash tube and applying a closing trigger signal to the control electrode of said first semiconductor switching devices;
    f. a control circuit, responsive to the voltage of said storage capacitor attaining a critical flash light emission stop voltage of said flash tube, for producing a second control signal, and
    g. a second trigger circuit connected between said first semiconductor switching device and said control circuit and responsive to said first and second control signals for bringing said first semiconductor switching device into the non-conducting state.

* * * * *